(12) United States Patent
Wang et al.

(10) Patent No.: US 11,715,864 B2
(45) Date of Patent: *Aug. 1, 2023

(54) METAL-ORGANIC-FRAMEWORK (MOF) COATED COMPOSITE SEPARATORS FOR ELECTROCHEMICAL DEVICES AND APPLICATIONS OF SAME

(71) Applicants: Ford Cheer International Limited, Tortola (VG); Xiongdi Fine Chemical Co. Ltd, Guangdong (CN)

(72) Inventors: Jimmy Wang, Monrovia, CA (US); Li Shen, Los Angeles, CA (US); Feng Lu, Guangdong (CN)

(73) Assignees: FORD CHEER INTERNATIONAL LIMITED, Tortola (VG); XIONGDI FINE CHEMICAL CO. LTD, Guangdong (CN)

( * ) Notice: Subject to any disclaimer, the term of this patent is extended or adjusted under 35 U.S.C. 154(b) by 486 days.

This patent is subject to a terminal disclaimer.

(21) Appl. No.: 16/822,483

(22) Filed: Mar. 18, 2020

(65) Prior Publication Data
US 2020/0220136 A1 Jul. 9, 2020

Related U.S. Application Data

(63) Continuation-in-part of application No. 16/822,343, filed on Mar. 18, 2020, and a continuation-in-part of
(Continued)

(51) Int. Cl.
*H01M 50/446* (2021.01)
*H01M 10/054* (2010.01)
(Continued)

(52) U.S. Cl.
CPC ....... *H01M 50/446* (2021.01); *H01M 50/403* (2021.01); *H01M 50/451* (2021.01); *H01M 50/497* (2021.01)

(58) Field of Classification Search
CPC ......... H01M 10/0567; H01M 10/0525; H01M 10/0565; H01M 10/4235; H01M 50/489;
(Continued)

(56) References Cited

U.S. PATENT DOCUMENTS

2013/0280611 A1  10/2013  Alkordi et al.
2014/0093790 A1*  4/2014  Liu ...................... C01B 32/166
                                                    429/405
(Continued)

FOREIGN PATENT DOCUMENTS

CN          1758463 A     4/2006
CN         105789668 A    7/2016
(Continued)

OTHER PUBLICATIONS

SIPO(ISA/CN), "International Search Report for PCT/CN2020/081053", China, dated Jun. 28, 2020.

*Primary Examiner* — Christian Roldan
(74) *Attorney, Agent, or Firm* — Locke Lord LLP; Tim Tingkang Xia, Esq.

(57) ABSTRACT

The invention provides a composite separator and an electrochemical device such as a battery with the composite separator. The composite separator includes at least one metal-organic framework (MOF) composite layer, and at least one porous layer serving a mechanical support for the at least one MOF composite layer. The at least one MOF composite layer includes at least one MOF material defining a plurality of pore channels and at least one polymer. The at least one MOF material is a class of crystalline porous scaffolds constructed from metal clusters with organic ligands and is activated at a temperature for a period of time such that the at least one MOF material includes unsaturated metal centers, open metal sites and/or structural defects that are able to complex with anions in electrolyte.

19 Claims, 11 Drawing Sheets

Related U.S. Application Data application No. 16/787,247, filed on Feb. 11, 2020, and a continuation-in-part of application No. 16/369,031, filed on Mar. 29, 2019, now abandoned, which is a continuation-in-part of application No. 15/888,223, filed on Feb. 5, 2018, now abandoned, and a continuation-in-part of application No. 15/888,232, filed on Feb. 5, 2018, now abandoned.

(60) Provisional application No. 62/823,193, filed on Mar. 25, 2019, provisional application No. 62/821,539, filed on Mar. 21, 2019, provisional application No. 62/803,725, filed on Feb. 11, 2019, provisional application No. 62/650,623, filed on Mar. 30, 2018, provisional application No. 62/650,580, filed on Mar. 30, 2018, provisional application No. 62/455,752, filed on Feb. 7, 2017, provisional application No. 62/455,800, filed on Feb. 7, 2017, provisional application No. 62/455,752, filed on Feb. 7, 2017.

(51) Int. Cl.
*H01M 10/0525* (2010.01)
*H01M 50/403* (2021.01)
*H01M 50/497* (2021.01)
*H01M 50/451* (2021.01)

(58) Field of Classification Search
CPC ............ H01M 50/491; H01M 10/054; H01M 50/403; H01M 50/406; H01M 50/4295; H01M 50/44; H01M 10/052; Y02E 60/10
USPC ........................................................ 429/338
See application file for complete search history.

(56) References Cited

U.S. PATENT DOCUMENTS

| | | | |
|---|---|---|---|
| 2016/0064772 A1* | 3/2016 | Choi | H01G 11/52 |
| | | | 429/317 |
| 2016/0243525 A1* | 8/2016 | Song | B01J 20/226 |
| 2016/0254567 A1* | 9/2016 | Cai | H01M 10/0564 |
| | | | 429/306 |
| 2017/0279109 A1* | 9/2017 | Wang | H01M 4/525 |
| 2018/0161755 A1* | 6/2018 | Matoga | C07F 3/003 |
| 2018/0226682 A1* | 8/2018 | Lu | H01M 10/054 |

FOREIGN PATENT DOCUMENTS

| | | |
|---|---|---|
| CN | 107068947 A | 8/2017 |
| CN | 108461692 A | 8/2018 |
| CN | 108807798 A | 11/2018 |
| CN | 109461873 A | 3/2019 |
| JP | 2016219411 A | 12/2016 |

* cited by examiner

METAL-ORGANIC-FRAMEWORK (MOF) COATED COMPOSITE SEPARATORS FOR ELECTROCHEMICAL DEVICES AND APPLICATIONS OF SAME

CROSS-REFERENCE TO RELATED PATENT APPLICATIONS

This application claims priority to and the benefit of U.S. provisional patent application Ser. No. 62/823,193, filed Mar. 25, 2019.

This application is also a continuation-in-part application of U.S. patent application Ser. No. 16/822,343 filed Mar. 18, 2020, which claims priority to and the benefit of U.S. provisional patent application Ser. No. 62/821,539, filed Mar. 21, 2019.

This application is also a continuation-in-part application of U.S. patent application Ser. No. 16/787,247, filed Feb. 11, 2020, which claims priority to and the benefit of U.S. provisional patent application Ser. No. 62/803,725, filed Feb. 11, 2019.

This application is also a continuation-in-part application of U.S. patent application Ser. No. 16/369,031, filed Mar. 29, 2019, which itself claims priority to and the benefit of U.S. provisional patent application Ser. Nos. 62/650,580 and 62/650,623, both filed Mar. 30, 2018.

This application is also a continuation-in-part application of U.S. patent application Ser. No. 15/888,223, filed Feb. 5, 2018, which claims priority to and the benefit of U.S. provisional patent application Ser. Nos. 62/455,752 and 62/455,800, both filed Feb. 7, 2017.

This application is also a continuation-in-part application of U.S. patent application Ser. No. 15/888,232, filed Feb. 5, 2018, which claims priority to and the benefit of U.S. provisional patent application Ser. Nos. 62/455,752 and 62/455,800, both filed Feb. 7, 2017.

Each of the above-identified applications is incorporated herein by reference in its entirety.

FIELD OF THE INVENTION

This invention relates generally to batteries, and more particularly, to metal-organic framework (MOF)-coated composite separators for electrochemical devices such as high safety, high-energy and high-power batteries, and application of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

Serving as the electrolyte reservoirs in batteries, separators serve as the interlayers, which mediates the transport of ions and blocking the flow of electrons. The structure and property of separators significantly impact the performance of batteries. For lithium ion batteries, particularly, the commercial polyolefin-based separators are suffered from poor thermal stability, insufficient mechanical modulus to block lithium dendrites, and inability to improve the $Li^+$ transference number of the electrolytes, which cause safety hazards, limit the energy and power performance, and shorten the lifetime of the batteries.

Ceramic coatings, which include ceramic particles such as $ZrO_2$, $Al_2O_3$ and $SiO_2$ particles within polymeric matrixes, e.g., disclosed in U.S. Pat. No. 6,432,586, have been applied onto the polyolefin-based separators, which partially mitigate the aforementioned issues. Particularly, such ceramic-coated separators exhibit improved thermal stability against thermal runaway, as well as improved ability to suppress the growth of lithium dendrites. However, such ceramic coatings cannot modulate the transport of the ions in electrolyte, rendering the batteries with a low $Li^+$ transference number (<0.4). Accordingly, developing new functionalities on separators for efficient $Li^+$ conduction represents the promising pathway for advanced battery separators.

The $Li^+$ transference number, which is defined as the ratio of $Li^+$ conductivity to overall ionic conductivity, plays as a critical role on governing electrochemical performances of batteries. The low $Li^+$ transference number of commercial electrolytes in polyolefin-based separator (<0.4) gives rise to concentration polarization, deteriorated electrolyte-electrode interfaces, reduced energy efficiency, aggravated side reactions and intensive joule heating, which can shorten the cycling life especially under fast charging/discharging condition. In other words, current polyolefin-based separators are not suitable for advanced batteries, such as lithium-metal batteries, high-power batteries with fast-charging capability.

Therefore, a heretofore unaddressed need exists in the art to address the aforementioned deficiencies and inadequacies.

SUMMARY OF THE INVENTION

This invention, in one aspect, relates to a composite separator used for an electrochemical device comprising at least one metal-organic framework (MOF) composite layer; and at least one porous layer serving a mechanical support for the at least one MOF composite layer. The at least one MOF composite layer comprises at least one metal-organic framework (MOF) material defining a plurality of pore channels and at least one polymer. The at least one MOF material is a class of crystalline porous scaffolds constructed from metal clusters with organic ligands and is activated at a temperature for a period of time such that the at least one MOF material comprises unsaturated metal centers, open metal sites and/or structural defects that are able to complex with anions in electrolyte.

In one embodiment, the at least one MOF composite layer is formed by coating of a mixture of the at least one MOF material with a polymer solution comprising the at least one polymer dissolved in at least one solvent on the at least one porous layer.

In one embodiment, said coating includes dip coating, slot-die coating, blade coating, spin coating, or electrospinning.

In one embodiment, the at least one porous layer has pores serving as liquid electrolyte hosts for conducting ions and is an electronic insulator for preventing short circuiting.

In one embodiment, the at least one porous layer comprises one or more polymers including poly-propylene (PP), poly-ethylene (PE), glass fiber (GF), cellulose, polyvinyl alcohol (PVA), polyethylene oxide (PEO), polyvinylidene fluoride (PVDF), polytetrafluoroethylene (PTFE), polyether ether ketone (PEEK), polyimide (PI), polyallylamine (PAH), polyurethane, polyacrylonitrile (PAN), polymethylmethacrylate (PMMA), polytetraethylene glycol diacrylate, copolymers thereof, or their combinations.

In one embodiment, the at least one MOF composite layer comprises an amount of the MOF material in a range of about 5-99 wt % and an amount of the least one polymer in a range of about 1-95 wt %.

In one embodiment, the at least one MOF material is activated by calcination, supercritical $CO_2$, or other treatments.

In one embodiment, the at least one MOF material has tunable ligand functionality and tunable pore sizes, where the tunable ligand functionality is negatively charged ligands by chemical modifications, and the tunable pore sizes is grafting of chemical groups in the ligands.

In one embodiment, the organic ligands comprise benzene-1,4-dicarboxylic acid (BDC), benzene-1,3,5-tricarboxylic acid (BTC), biphenyl-4,4'-dicarboxylic acid (BPDC), or their derivatives, and the metal clusters comprise magnesium (Mg), Aluminium (Al), Titanium (Ti), Vanadium (V), Chromium (Cr), Manganese (Mn), Iron (Fe), Cobalt (Co), Nickel (Ni), Copper (Cu), Zinc (Zn), or Zirconium (Zr).

In one embodiment, the at least one MOF material comprises HKUST-1, MIL-100-Al, MIL-100-Cr, MIL-100-Fe, UiO-66, UiO-67, PCN series, MOF-808, MOF-505, MOF-74, or their combinations.

In one embodiment, the at least one MOF material comprises a zirconium containing MOF (Zr-MOF) or zirconium terephthalate-based MOF having a general formula of $Zr_6(\mu3-O_4)(\mu3-OH_4)$ (—$COO)_8(OH)_4(H_2O)_n$, where n is an integer less than 10.

In one embodiment, the at least one polymer comprises polyvinylidene fluoride (PVDF), polytetrafluoroethylene (PTFE), poly(vinylidene fluoride-co-hexafluoropropylene) (PVDF-HFP), PVDF-tetrahydrofuran (PVDF-THF), PVDF-chlorotrifluoroethylene (PVDF-CTFE), poly(methyl methacrylate) (PMMA), polyacrylonitrile (PAN), and polyethyleneoxide (PEO), copolymers thereof, or their combinations.

In one embodiment, the at least one solvent comprises acetone, water, methanol, ethanol, acetic acid, dimethylformamide (DMF), acetone, water, methanol, ethanol, acetic acid, dimethylformamide (DMF), dimethylacetamide (DMAc), N-Methyl-2-pyrrolidone (NMP), tetrahydrofuran (THF), or their combinations.

In another aspect, the invention relates to an electrochemical device, comprising a positive electrode, a negative electrode, an electrolyte disposed between the positive and negative electrodes, and a separator disposed in the electrolyte. The electrolyte is an liquid electrolyte comprising a metal salt dissolved in a non-aqueous solvent. The separator is the composite separator as disclosed.

In one embodiment, the non-aqueous solvent comprises one or more of ethylene carbonate (EC), propylene carbonate (PC), vinylene carbonate (VC), fluoroethylene carbonate (FEC), butylene carbonate (BC), dimethyl carbonate (DMC), diethyl carbonate (DEC), ethylmethyl carbonate (EMC), methylpropyl carbonate (MPC), butylmethyl carbonate (BMC), ethylpropyl carbonate (EPC), dipropyl carbonate (DPC), cyclopentanone, sulfolane, dimethyl sulfoxide, 3-methyl-1,3-oxazolidine-2-one, γ-butyrolactone, 1,2-di-ethoxymethane, tetrahydrofuran, 2-methyltetrahydrofuran, 1,3-dioxolane, methyl acetate, ethyl acetate, nitromethane, 1,3-propane sultone, γ-valerolactone, methyl isobutyryl acetate, 2-methoxyethyl acetate, 2-ethoxyethyl acetate, diethyl oxalate, an ionic liquid, chain ether compounds including at least one of gamma butyrolactone, gamma valerolactone, 1,2-dimethoxyethane and diethyl ether, and cyclic ether compounds including at least one of tetrahydrofuran, 2-methyltetrahydrofuran, 1,3-dioxolane and dioxane.

In one embodiment, anions in the liquid electrolytes are spontaneously adsorbed by the at least one MOF material and immobilized within the pore channels, thereby liberating metal ions and leading to the metal ions transport with a metal ion transference number higher than that of a separator without the at least one MOF material.

In one embodiment, the metal ions transference number is a ratio of a metal ion conductivity to an ionic conductivity, where the ionic conductivity is a total value of the metal ion conductivity and anionic conductivity.

In one embodiment, the metal ion transference number of the liquid electrolytes in the composite separator is in a range of about 0.5-1.

In one embodiment, the metal salt comprises one or more of a lithium salt, a sodium salt, a magnesium salt, a zinc salt, and an aluminum salt.

In one embodiment, the lithium salt comprises one or more of lithium hexafluorophosphate, lithium hexafluoroarsenate, lithium bis(trifluoromethlysulfonylimide) (LiTFSI), lithium bis(trifluorosulfonylimide), lithium trifluoromethanesulfonate, lithium fluoroalkylsufonimides, lithium fluoroarylsufonimides, lithium bis(oxalate borate), lithium tris(trifluoromethylsulfonylimide)methide, lithium tetrafluoroborate, lithium perchlorate, lithium tetrachloroaluminate, and lithium chloride.

In one embodiment, the sodium salt comprises one or more of sodium trifluoromethanesulfonate, $NaClO_4$, $NaPF_6$, $NaBF_4$, NaTFSI (sodium(I) Bis(trifluoromethanesulfonyl)imide), and NaFSI (sodium(I) Bis(fluorosulfonyl)imide).

In one embodiment, the magnesium salt comprises one or more of magnesium trifluoromethanesulfonate, $Mg(ClO_4)_2$, $Mg(PF_6)_2$, $Mg(BF_4)_2$, $Mg(TFSI)_2$ (magnesium(II) Bis(trifluoromethanesulfonyl)imide), and $Mg(FSI)_2$ (magnesium (II) Bis(fluorosulfonyl)imide).

In one embodiment, the zinc salt comprises one or more of zinc trifluoromethanesulfonate, $Zn(ClO_4)_2$, $Zn(PF_6)_2$, $Zn(BF_4)_2$, $Zn(TFSI)_2$ (zinc(II) Bis(trifluoromethanesulfonyl)imide), $Zn(FSI)_2$ (zinc(II) Bis(fluorosulfonyl)imide).

In one embodiment, the electrochemical device is a lithium battery, a sodium battery, a magnesium battery, or a zinc metal battery.

In one embodiment, for the lithium battery, the positive electrode comprises one or more of $LiCoO_2$ (LCO), LiNiMnCoO_2$ (NMC), lithium iron phosphate ($LiFePO_4$), lithium iron fluorophosphate ($Li_2FePO_4F$), an over-lithiated layer by layer cathode, spinel lithium manganese oxide ($LiMn_2O_4$), lithium cobalt oxide ($LiCoO_2$), $LiNi_{0.5}Mn_{1.5}O_4$, lithium nickel cobalt aluminum oxide including $LiNi_{0.8}Co_{0.15}Al_{0.05}O_2$ or NCA, lithium vanadium oxide ($LiV_2O_5$), and $Li_2MSiO_4$ with M being composed of a ratio of Co, Fe, and/or Mn; and the negative electrode comprises one or more of lithium metal (Li), graphite, hard or soft carbon, graphene, carbon nanotubes, titanium oxide including at least one $Li_4Ti_5O_{12}$ and $Ti)_2$, silicon (Si), tin (Sn), germanium (Ge), silicon monoxide (SiO), silicon oxide ($SiO_2$), tin oxide ($SnO_2$), and transition metal oxide including at least one of $Fe_2O_3$, $Fe_3O_4$, $Co_3O_4$ and $Mn_xO_y$; and In one embodiment, the positive electrode comprises one or more of $NaMnO_2$, $NaFePO_4$ and $Na_3V_2(PO_4)_3$ for the sodium battery, one or more of $TiSe_2$, $MgFePO_4F$, $MgCo_2O_4$ and $V_2O_5$ for the magnesium battery, or one or more of $\gamma\text{-}MnO_2$, $ZnMn_2O_4$, and $ZnMnO_2$ for the zinc battery.

These and other aspects of the present invention will become apparent from the following description of the preferred embodiment taken in conjunction with the following drawings, although variations and modifications therein can be affected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTIONS OF THE INVENTION

Figure 1:
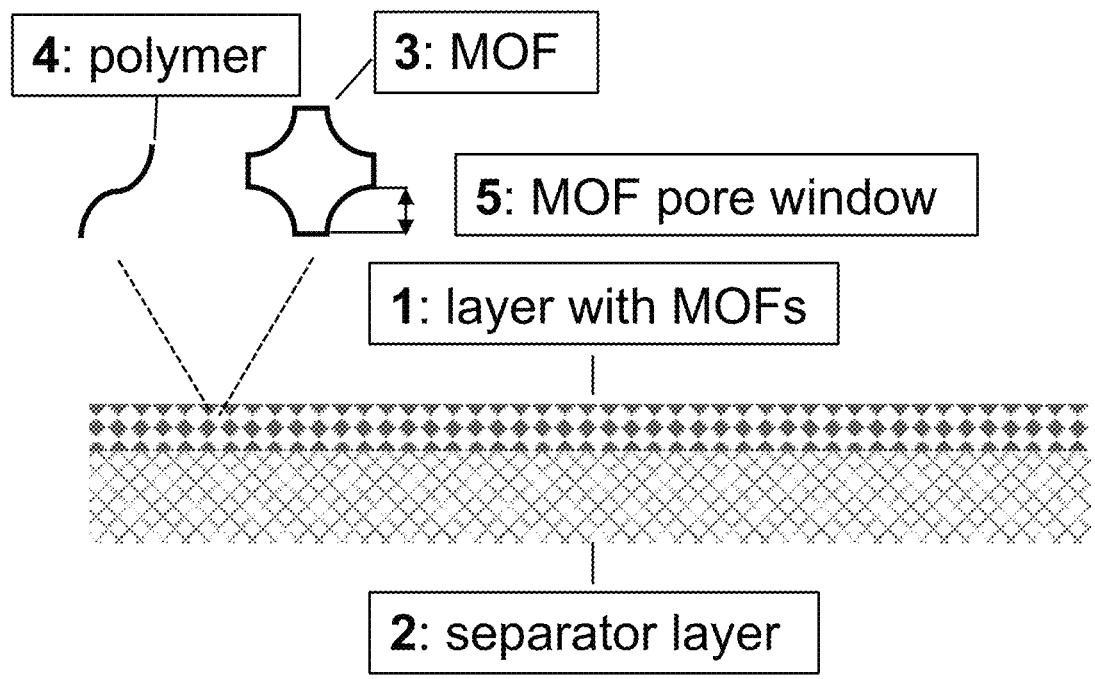
FIG. 1 shows schematic of a composite separator, according to embodiments of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising," or "includes" and/or "including" or "has" and/or "having", or "carry" and/or "carrying," or "contain" and/or "containing," or "involve" and/or "involving, and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in this disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in this disclosure, the phrase "at least one of A, B, and C" should be construed to mean a logical (A or B or C), using a non-exclusive logical OR. As used herein, the term "and/or" includes any and all combinations of one or more of the associated listed items.

Embodiments of the invention are illustrated in detail hereinafter with reference to accompanying drawings. The description below is merely illustrative in nature and is in no way intended to limit the invention, its application, or uses.

The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

This invention in one aspect relates to a metal-organic frameworks (MOFs)-coated separator (composite separator) that can significantly improve the $Li^+$ transference number of commercial electrolytes (>0.6), where the MOFs are porous coordination solids periodically constructed by metal clusters and organic linkers, forming ordered porous scaffolds with various dimensions. The MOFs disclosed herein contain unsaturated coordination sites, structural defects, or negatively charged moieties that can immobilize/repel the anion movement and facilitate cation (lithium ion) conduction. Meanwhile, the applications of MOFs-coated separators in batteries offers other multiple benefits, including, but are not limited to: alleviated concentration polarization, accelerated electrode reaction kinetics, reduced electrolyte decomposition, improved thermal stability, etc.

The use of metal-organic frameworks in batteries have been reported. For example, an electrolyte membrane comprising metal-organic frameworks, polymers and electrolytes are discussed in U.S. Pat. Nos. 9,105,940, and 10,347,939, where a crosslinking approach of preparing composite membrane is disclosed by covalently bonding metal-organic frameworks (e.g., carboxylic acid) with polymers (e.g., amine). A solid polymer electrolyte comprising metal-organic frameworks, lithium salts and lithium-ion conducting polymers are disclosed in Chinese Patent Nos. CN103474696B and CN106532112A, where the benefit of adding claimed metal-organic frameworks into solid polymer electrolytes assemble the effect of conventional ceramic particles. The claimed benefits of adding metal-organic frameworks in solid polymer electrolytes include: reduced polymer crystallinity, improved $Li^+$ conductivity, enhanced mechanical and thermal stability. In addition, a solid lithium-ion electrolyte comprising metal-organic frameworks is disclosed in U.S. Pat. No. 9,525,190, where a post-synthesis approach by grafting alkoxide on metal-organic frameworks is disclosed. The metal center in claimed metal-organic frameworks is capped with a lithium compound (lithium alkoxide), followed by soaking in a typical electrolyte. A polyolefin-based separator coated with particles of metal-organic frameworks ($NH_2$-MIL-125(Ti)), a titanium terephthalate-based framework, is disclosed for the application of stabilizing lithium-metal anode (Chemical Science, 2017, 8, 4285). The benefit of incorporating MOFs is a homogenous electrodeposition of lithium ions via the interactions between the —$NH_2$ groups (in ligands) and $Li^+$ ions. Zirconium-based MOFs (UiO-66-$NH_2$) particles with cationic centers are synthesized by chemically modifying the amine groups in the ligands (Energy Storage Materials (2019)). Such modified positively charged particles are then incorporated within a polymeric electrolyte, which leads to improved lithium ion transference number through the interactions between the cationic centers and anions; and MOFs-based separators are disclosed in application of lithium-sulphur batteries (Nature Energy 1.7 (2016): 16094, ACS Energy Letters 2.10 (2017): 2362-2367). The claimed benefit is a mitigated shuttling of dissolved polysulfides by blocking their transport through the microporous apertures of the MOFs. Other claimed benefit reports the strong chemisorption of poylsulfides in MOFs-carbon nanotube composite separators (Energy Storage Materials 14 (2018): 383-391 and Nature Communications 8 (2017): 14628).

However, the invention strikingly differentiates from the above-mentioned art in following aspects: (1) The metal-organic frameworks described herein contain open metal sites (OMSs), the OMSs can be understood as coordinately unsaturated metal sites, exposed metal sites and the like. (2) The MOFs with the OMSs interact directly with commercially available liquid electrolytes (e.g., $LiPF_6$-based electrolytes), where OMSs can spontaneously bound anions (e.g., $PF_6^-$) in electrolytes, forming negatively charged ion channels and facilitating translocation of lithium ions. (3) The separators coated by MOFs with the OMSs effectively enhance the $Li^+$ transference number or $Li^+$ conductivity of the electrolytes, in comparison with commercial polyolefin-based separators. (4) The metal-organic frameworks described herein may also be modified with negatively charged moieties to exclude/repel the anion movements and allow the effective transport of cations, mimicking the ionic channels that commonly exist in biological systems.

Specifically, in one aspect of the invention, the composite separator used for an electrochemical device includes at least one MOF composite layer; and at least one porous layer serving a mechanical support for the at least one MOF composite layer. The at least one MOF composite layer comprises at least one metal-organic framework (MOF) material defining a plurality of pore channels and at least one polymer. The at least one MOF material is a class of crystalline porous scaffolds constructed from metal clusters with organic ligands and is activated at a temperature for a period of time such that the at least one MOF material comprises unsaturated metal centers, open metal sites and/or structural defects that are able to complex with anions in electrolyte. In certain embodiments, the at least one MOF material is activated by calcination, supercritical $CO_2$, or other treatments.

In certain embodiments, the at least one MOF composite layer is formed by coating of a mixture of the at least one MOF material with a polymer solution comprising the at least one polymer dissolved in at least one solvent on the at least one porous layer. In certain embodiments, said coating includes dip coating, slot-die coating, blade coating, spin coating, or electrospinning.

In certain embodiments, the at least one porous layer has pores serving as liquid electrolyte hosts for conducting ions and is an electronic insulator for preventing short circuiting. In certain embodiments, the at least one porous layer comprises one or more polymers including poly-propylene (PP), poly-ethylene (PE), glass fiber (GF), cellulose, polyvinyl alcohol (PVA), polyethylene oxide (PEO), polyvinylidene fluoride (PVDF), polytetrafluoroethylene (PTFE), polyether ether ketone (PEEK), polyimide (PI), polyallylamine (PAH), polyurethane, polyacrylonitrile (PAN), polymethylmethacrylate (PMMA), polytetraethylene glycol diacrylate, copolymers thereof, or their combinations.

In certain embodiments, the at least one MOF composite layer comprises an amount of the MOF material in a range of about 5-99 wt % and an amount of the least one polymer in a range of about 1-95 wt %.

In certain embodiments, the at least one MOF material has tunable ligand functionality and tunable pore sizes, where the tunable ligand functionality is negatively charged ligands by chemical modifications, and the tunable pore sizes is grafting of chemical groups in the ligands.

In certain embodiments, the organic ligands comprise benzene-1,4-dicarboxylic acid (BDC), benzene-1,3,5-tricarboxylic acid (BTC), biphenyl-4,4'-dicarboxylic acid (BPDC), or their derivatives, and the metal clusters comprise magnesium (Mg), Aluminium (Al), Titanium (Ti), Vanadium (V), Chromium (Cr), Manganese (Mn), Iron (Fe), Cobalt (Co), Nickel (Ni), Copper (Cu), Zinc (Zn), or Zirconium (Zr).

In certain embodiments, the at least one MOF material comprises HKUST-1, MIL-100-Al, MIL-100-Cr, MIL-100-Fe, UiO-66, UiO-67, PCN series, MOF-808, MOF-505, MOF-74, or their combinations.

In certain embodiments, the at least one MOF material comprises a zirconium containing MOF (Zr-MOF) or zirconium terephthalate-based MOF having a general formula of $Zr_6(\mu 3-O_4)(\mu 3-OH_4)(—COO)_8(OH)_4(H_2O)_n$, where n is an integer less than 10.

In certain embodiments, the at least one polymer comprises polyvinylidene fluoride (PVDF), polytetrafluoroethylene (PTFE), poly(vinylidene fluoride-co-hexafluoropropylene) (PVDF-HFP), PVDF-tetrahydrofuran (PVDF-THF), PVDF-chlorotrifluoroethylene (PVDF-CTFE), poly(methyl methacrylate) (PMMA), polyacrylonitrile (PAN), and polyethyleneoxide (PEO), copolymers thereof, or their combinations.

In certain embodiments, the at least one solvent comprises acetone, water, methanol, ethanol, acetic acid, dimethylformamide (DMF), acetone, water, methanol, ethanol, acetic acid, dimethylformamide (DMF), dimethyl acetamide (DMAc), N-Methyl-2-pyrrolidone (NMP), tetrahydrofuran (THF), or their combinations.

In another aspect, the invention relates to an electrochemical device, comprising a positive electrode, a negative electrode, an electrolyte disposed between the positive and negative electrodes, and a separator disposed in the electrolyte. The electrolyte is an liquid electrolyte comprising a metal salt dissolved in a non-aqueous solvent. The separator is the composite separator as disclosed.

In certain embodiments, the non-aqueous solvent comprises one or more of ethylene carbonate (EC), propylene carbonate (PC), vinylene carbonate (VC), fluoroethylene carbonate (FEC), butylene carbonate (BC), dimethyl carbonate (DMC), diethyl carbonate (DEC), ethylmethyl carbonate (EMC), methylpropyl carbonate (MPC), butylmethyl carbonate (BMC), ethylpropyl carbonate (EPC), dipropyl carbonate (DPC), cyclopentanone, sulfolane, dimethyl sulfoxide, 3-methyl-1,3-oxazolidine-2-one, γ-butyrolactone, 1,2-di-ethoxymethane, tetrahydrofuran, 2-methyltetrahydrofuran, 1,3-dioxolane, methyl acetate, ethyl acetate, nitromethane, 1,3-propane sultone, γ-valerolactone, methyl isobutyryl acetate, 2-methoxyethyl acetate, 2-ethoxyethyl acetate, diethyl oxalate, an ionic liquid, chain ether compounds including at least one of gamma butyrolactone, gamma valerolactone, 1,2-dimethoxyethane and diethyl ether, and cyclic ether compounds including at least one of tetrahydrofuran, 2-methyltetrahydrofuran, 1,3-dioxolane and dioxane.

In certain embodiments, anions in the liquid electrolytes are spontaneously adsorbed by the at least one MOF material and immobilized within the pore channels, thereby liberating metal ions and leading to the metal ions transport with a metal ion transference number higher than that of a separator without the at least one MOF material.

In certain embodiments, the metal ions transference number is a ratio of a metal ion conductivity to an ionic conductivity. The ionic conductivity is a total value of the metal ion conductivity and anionic conductivity.

In certain embodiments, the metal ion transference number of the liquid electrolytes in the composite separator is in a range of about 0.5-1.

In certain embodiments, the metal salt comprises one or more of a lithium salt, a sodium salt, a magnesium salt, a zinc salt, and an aluminum salt.

In certain embodiments, the lithium salt comprises one or more of lithium hexafluorophosphate, lithium hexafluoroarsenate, lithium bis(trifluoromethlysulfonylimide) (LiTFSI), lithium bis(trifluorosulfonylimide), lithium trifluoromethanesulfonate, lithium fluoroalkylsufonimides, lithium fluoroarylsufonimides, lithium bis(oxalate borate), lithium tris(trifluoromethylsulfonylimide)methide, lithium tetrafluoroborate, lithium perchlorate, lithium tetrachloroaluminate, and lithium chloride.

In certain embodiments, the sodium salt comprises one or more of sodium trifluoromethanesulfonate, $NaClO_4$, $NaPF_6$, $NaBF_4$, NaTFSI (sodium(I) Bis(trifluoromethanesulfonyl) imide), and NaFSI (sodium(I) Bis(fluorosulfonyl)imide).

In certain embodiments, the magnesium salt comprises one or more of magnesium trifluoromethanesulfonate, $Mg(ClO_4)_2$, $Mg(PF_6)_2$, $Mg(BF_4)_2$, $Mg(TFSI)_2$ (magnesium (II) Bis(trifluoromethanesulfonyl)imide), and $Mg(FSI)_2$ (magnesium(II) Bis(fluorosulfonyl)imide).

In certain embodiments, the zinc salt comprises one or more of zinc trifluoromethanesulfonate, $Zn(ClO_4)_2$, $Zn(PF_6)_2$, $Zn(BF_4)_2$, $Zn(TFSI)_2$ (zinc(II) Bis(trifluoromethanesulfonyl)imide), $Zn(FSI)_2$ (zinc(II) Bis(fluorosulfonyl)imide).

In certain embodiments, the electrochemical device is a lithium battery, a sodium battery, a magnesium battery, or a zinc metal battery.

In certain embodiments, for the lithium battery, the positive electrode comprises one or more of $LiCoO_2$ (LCO), $LiNiMnCoO_2$ (NMC), lithium iron phosphate ($LiFePO_4$), lithium iron fluorophosphate ($Li_2FePO_4F$), an over-lithiated layer by layer cathode, spinel lithium manganese oxide ($LiMn_2O_4$), lithium cobalt oxide ($LiCoO_2$), $LiNi_{0.5}Mn_{1.5}O_4$, lithium nickel cobalt aluminum oxide including $LiNi_{0.8}Co_{0.15}Al_{0.05}O_2$ or NCA, lithium vanadium oxide ($LiV_2O_5$), and $Li_2MSiO_4$ with M being composed of a ratio of Co, Fe, and/or Mn; and the negative electrode comprises one or more of lithium metal (Li), graphite, hard or soft carbon, graphene, carbon nanotubes, titanium oxide including at least one $Li_4Ti_5O_{12}$ and $TiO_2$, silicon (Si), tin (Sn), germanium (Ge), silicon monoxide (SiO), silicon oxide ($SiO_2$), tin oxide ($SnO_2$), and transition metal oxide including at least one of $Fe_2O_3$, $Fe_3O_4$, $Co_3O_4$ and $Mn_xO_y$; and In certain embodiments, the positive electrode comprises one or more of $NaMnO_2$, $NaFePO_4$ and $Na_3V_2(PO_4)_3$ for the sodium battery, one or more of $TiSe_2$, $MgFePO_4F$, $MgCo_2O_4$ and $V_2O_5$ for the magnesium battery, or one or more of $\gamma$-$MnO_2$, $ZnMn_2O_4$, and $ZnMnO_2$ for the zinc battery.

Referring to the FIG. 1, a composite separator is shown according to one embodiment of the invention. The composite separator comprises a composite layer 1 containing particles of metal-organic frameworks (MOFs) and a porous support separator layer 2. Preferably, the support separator layer 2 is commercially available separators, which contain pores serving as liquid electrolyte host for conducting ions. Meanwhile, the support separator layer 2 is an electronic insulator for preventing short circuiting. The composite layer 1 as a functional layer includes the particles of MOFs 3 and a polymer matrix 4, where the MOFs serve as functional moieties tuning electrolyte properties and the polymer serves as either binder or mechanical matrix for adhering MOFs on the support separator layer 2.

In certain embodiments, the support separator layer 2 includes, but is not limited to, poly-propylene (PP), polyethylene (PE), glass fiber (GF), cellulose, polyvinyl alcohol (PVA), polyethylene oxide (PEO), polyvinylidene fluoride (PVDF), polytetrafluoroethylene (PTFE), Polyether ether ketone (PEEK), polyimide (PI), polyallylamine (PAH), polyurethane, polyacrylonitrile (PAN), polymethylmethacrylate (PMMA), polytetraethylene glycol diacrylate, copolymers thereof or their combinations.

The MOFs 3 a class of crystalline porous scaffolds constructed from metal cluster nodes and organic ligands and represent a class of porous coordination solids with versatile structural and functional turnabilities. In certain embodiments, the particles of the MOFs 3 are constructed by periodically bridging inorganic metal clusters with organic ligands (linkers), forming pore windows 5 generally below 2 nanometres, yet mesoporous MOFs can be prepared by isoreticular expansion of organic ligands. Suitable ligands are preferably, but are not limited to, benzene-1,4-dicarboxylic acid (BDC), benzene-1,3,5-tricarboxylic acid (BTC) and their derivatives. Examples of various ligand derivatives based on BDC are enclosed herein in table 2. Suitable metal clusters include, but are not limited to, magnesium (Mg), Aluminium (Al), Titanium (Ti), Vanadium (V), Chromium (Cr), Manganese (Mn), Iron (Fe), Cobalt (Co), Nickel (Ni), Copper (Cu), Zinc (Zn), Zirconium (Zr), or the like.

TABLE 1

Selected MOFs for high-performance composite separators

| | Formula | Ligand Structure | Pore size (nm) |
|---|---|---|---|
| HKUST-1 | $Cu_3(BTC)_2$ | | 1.1 |
| MIL-100-Al | $Al_3O(OH)(BTC)_2$ | | 2.5, 2.9 |
| MIL-100-Cr | $Cr_3O(OH)(BTC)_2$ | | (windows: 0.6, 0.9) |
| MIL-100-Fe | $Fe_3O(OH)(BTC)_2$ | | |

BTC
benzene-1,3,5-tricarboxylic acid

TABLE 1-continued

Selected MOFs for high-performance composite separators

| Formula | Ligand Structure | Pore size (nm) |
|---|---|---|
| UiO-66 | $Zr_6O_4(OH)_4(BDC)_6$ | 0.75, 1.2 |
| | BDC benzene-1,4-dicarboxylic acid | |
| UiO-67 | $Zr_6O_4(OH)_4(BPDC)_6$ | 1.2, 2.3 |
| | BPDC Biphenyl-4,4'-dicarboxylic acid | |

Table 1 shows MOFs examples, including their typical formulas, ligand structures and approximate pore sizes.

In certain embodiments, MIL-100 serial MOFs ($M_3O(BTC)_2OH.(H_2O)_2$) are built from $M^{3+}$ (M=Al, Cr, Fe) octahedra trimer sharing a common $\mu_3$-O. Each $M^{3+}$ is bonded to four oxygen atoms of bidendate dicarboxylate (BTC), and their linkage generates a hierarchical structure with mesoporous cages (25 and 29 Å) that are accessible through microporous windows (6 and 9 Å). The corresponding terminals in octahedra are generally occupied by removable guest molecules.

In certain embodiments, UiO-66 is obtained by bridging $Zr_6O_4(OH)_4$ inorganic clusters with BDC linkers (BDC=1,4-dicarboxylate). The $Zr_6$-octahedrons are alternatively coordinated by $\mu_3$-O, $\mu_3$-OH and O atoms from BDC, where $\mu_3$-OH can undergo dehydroxylation to form a distorted $Zr_6O_6$ node (seven-coordinated Zr) upon thermal activation.

In certain embodiments, UiO-67 has the same topology as UiO-66 with expanded pore channels due to the larger linker size of BPDC (BPDC=biphenyl-4,4'-dicarboxylate). Both UiO-66 and UiO-67 contain two types of pore size, small tetrahedral pore and large octahedral pore. Other ligands derivatives are exemplified in Table 2.

TABLE 2

Zirconium-based MOF with varied functional ligands

| Zirconium-based MOF | | Ligand Structure |
|---|---|---|
| UiO-66 | Terephthalic acid (BDC) | |
| UiO-67 | 4,4'-biphenyldicarboxylic acid (BPDC) | |
| UiO-66-NH$_2$ | 2-Aminoterephthalic acid (NH$_2$-BDC) | |
| UiO-66-NO$_2$ | 2-nitroterephthalic acid (NO$_2$-BDC) | |

TABLE 2-continued

Zirconium-based MOF with varied functional ligands

| Zirconium-based MOF | | Ligand Structure |
|---|---|---|
| UiO-66-OH | 2-Hydroxyterephthalic (OH-BDC) | (structure) |
| UiO-66-Br | 2-Bromoterephthalic acid (Br-BDC) | (structure) |

Generally, MOFs are synthesized in the presence of a solvent (e.g., water) and the ligands, both of which coordinate with the MOF's metal centers. Removal of the solvent molecules (e.g., at an elevated temperature under vacuum) breaks the solvent coordination from the MOFs, resulting in MOF scaffolds with unsaturated metal centers. The conditions for solvent molecule removal include a temperature ranging from about 200° C. to about 220° C. at a pressure of about 30 mTorr. This temperature range is suitable for removing any solvent, although it is to be understood that high boiling point solvent may require longer evacuation times than low boiling point solvents. In one example, the powder form an MOF material is degassed or activated under vacuum at a high/elevated temperature (e.g., from about 200° C. to about 220° C.) to remove absorbed water molecules. Other solvent molecule removal methods can also be used to practice the invention.

Polymer matrix 4 includes, for example, but are not limited to, polyvinylidene fluoride (PVDF), polytetrafluoroethylene (PTFE), poly(vinylidene fluoride-co-hexafluoropropylene) (PVDF-HFP), PVDF-tetrahydrofuran (PVDF-THF), PVDF-chlorotrifluoroethylene (PVDF-CTFE), poly (methyl methacrylate) (PMMA), polyacrylonitrile (PAN), and polyethyleneoxide (PEO).

In certain embodiments, the MOF particles 3 are blended with the polymer matrix 4, and the resulting mixture is composite with the support separator layer 2. The composite separator can be prepared by methods of, but is not limited to, coating, lamination, extrusion and electrospinning. Suitable examples of coating include, but are not limited to, dip coating, slot-die coating, blade coating and spin coating.

The structure of the composite separator is not limited in the form of single layer-by-layer structure as shown in FIG. 1. In certain embodiments, the stacking sequence and number of layers 1 and 2 can be of any combinations. For example, the MOFs layer 1 can be present on the surface of the support separator layer 2 or can be coated on the surface of pores in the support separator layer 2. In other examples, the MOFs layer 1 can fill up or interpenetrate with the support separator layer 2.

In certain embodiments, the liquid electrolyte solvent(s) include ethylene carbonate (EC), propylene carbonate (PC), vinylene carbonate (VC), fluoroethylene carbonate (FEC), butylene carbonate (BC), dimethyl carbonate (DMC), diethyl carbonate (DEC), ethylmethyl carbonate (EMC), methylpropyl carbonate (MPC), butylmethyl carbonate (BMC), ethylpropyl carbonate (EPC), dipropyl carbonate (DPC), cyclopentanone, sulfolane, dimethyl sulfoxide, 3-methyl-1,3-oxazolidine-2-one, γ-butyrolactone, 1,2-diethoxymethane, tetrahydrofuran, 2-methyltetrahydrofuran, 1,3-dioxolane, methyl acetate, ethyl acetate, nitromethane, 1,3-propane sultone, γ-valerolactone, methyl isobutyryl acetate, 2-methoxyethyl acetate, 2-ethoxyethyl acetate, diethyl oxalate, or an ionic liquid, chain ether compounds such as gamma butyrolactone, gamma valerolactone, 1,2-dimethoxyethane, and diethyl ether, cyclic ether compounds such as tetrahydrofuran, 2-methyltetrahydrofuran, 1,3-dioxolane, and dioxane, or mixtures of two or more of these solvents.

In certain embodiments, examples of suitable lithium salts include lithium hexafluorophosphate, lithium hexafluoroarsenate, lithium bis(trifluoromethlysulfonylimide) (LiTFSI), lithium bis(trifluorosulfonylimide), lithium trifluoromethanesulfonate, lithium fluoroalkylsufonimides, lithium fluoroarylsufonimides, lithium bis(oxalate borate), lithium tris (trifluoromethylsulfonylimide)methide, lithium tetrafluoroborate, lithium perchlorate, lithium tetrachloroaluminate, lithium chloride, or combinations thereof.

Figure 2:
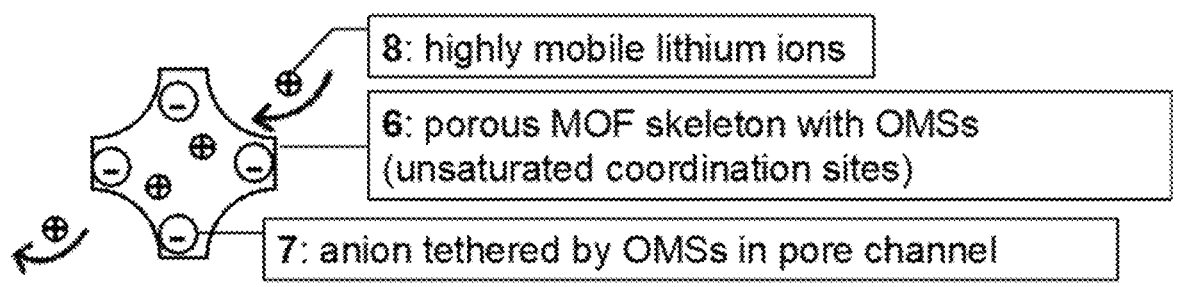
FIG. 2 shows schematic of a metal-organic framework with open metal sites and respective ion conduction behaviors of lithium ions and anions, according to embodiments of the invention.

Referring to FIG. 2, the feature and functionalities of a MOF particle in a composite separator and electrolyte is shown according to one embodiment of the invention. In this exemplary example, the open metal sites (OMSs) 6 in the MOF skeleton are defined as the unsaturated coordination sites from metal centers, which can be derived from eliminations of coordinated solvents or ligands on metal sites by thermal treatments (or thermal activation). The unsaturated metal sites can bound anionic species 7 in electrolyte, affording highly mobile lithium ions 8 through MOF pore channels.

Figure 3:
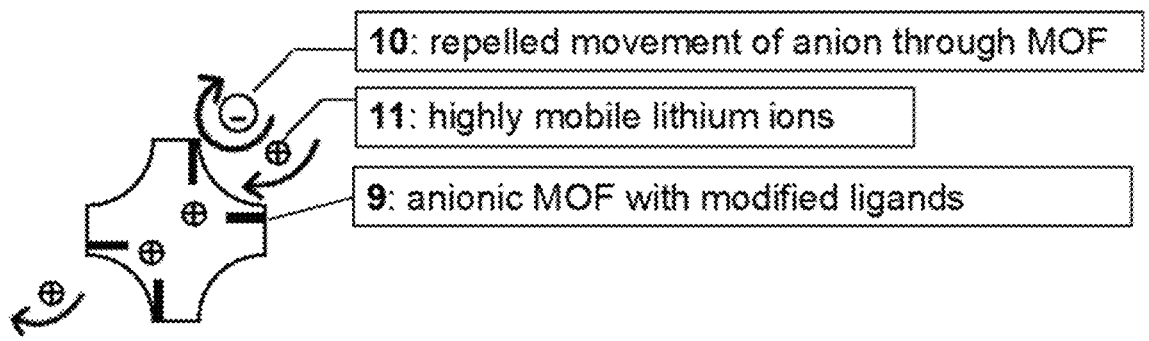
FIG. 3 shows schematic of a metal-organic framework chemically modified ligands and respective ion conduction behaviors of lithium ions and anions, according to embodiments of the invention.

Referring to FIG. 3, another functionality of a MOF particle in composite separator and electrolyte is shown according to one embodiment of the invention. The negatively charged MOF 9 enabled by modified ligands repel the movement of anions 10, thus affording highly mobile lithium ions 11 and improved lithium ion transference number.

The advantages of presented ion conduction behaviors in the MOF pore channels include, but are not limited to, (1)

high lithium ion transference number; (2) alleviated concentration polarization; (3) improved reaction kinetics; (4) affinitive electrode-electrolyte interfaces; (5) suppressed dendritic lithium formation; (6) enhanced power density; (7) superior durability at high rate; and (8) improved thermal stability.

In certain embodiments, for lithium-based batteries, the positive electrode may be formed of $LiCoO_2$ (LCO) and the negative electrode may be formed of lithium metal (Li). Other examples of suitable positive electrodes include LiNiMnCoO$_2$ (NMC), lithium iron phosphate ($LiFePO_4$), lithium iron fluorophosphate ($Li_2FePO_4F$), an over-lithiated layer by layer cathode, spinel lithium manganese oxide ($LiMn_2O_4$), lithium cobalt oxide ($LiCoO_2$), $LiNi_{0.5}Mn_{1.5}O_4$, lithium nickel cobalt aluminum oxide (e.g., $LiNi_{0.8}Co_{0.15}Al_{0.05}O_2$ or NCA), lithium vanadium oxide ($LiV_2O_5$), $Li_2MSiO_4$ (M is composed of any ratio of Co, Fe, and/or Mn), or any other suitable material that can sufficiently undergo lithium insertion and deinsertion. Other examples of suitable negative electrodes include graphite, hard or soft carbon, graphene, carbon nanotubes, titanium oxide ($Li_4Ti_5O_{12}$, $TiO_2$), silicon (Si), tin (Sn), Germanium (Ge), silicon monoxide (SiO), silicon oxide ($SiO_2$), tin oxide ($SnO_2$), transition metal oxide ($Fe_2O_3$, $Fe_3O_4$, $Co_3O_4$, $Mn_xO_y$, etc), or any other suitable material that can undergo intercalation, conversion or alloying reactions with lithium.

These and other aspects of the present invention are further described in the following section. Without intending to limit the scope of the invention, further exemplary implementations of the present invention according to the embodiments of the present invention are given below. Note that titles or subtitles can be used in the examples for the convenience of a reader, which in no way should limit the scope of the invention. Moreover, certain theories are proposed and disclosed herein; however, in no way should they, whether they are right or wrong, limit the scope of the invention so long as the invention is practiced according to the invention without regard for any particular theory or scheme of action.

Example 1

In this exemplary example, a polymer matrix solution is prepared by dissolving about 1.4 g of PVDF-HFP in about 20 mL acetone at about 50° C. The MOF is exemplified by UiO-66, which is synthesized by dissolving $ZrOCl_2.8H_2O$ and BDC in N,N-dimethylformamide and subsequent hydrothermal treatment (about 120° C. for about 24 hours) in autoclaves. The as-synthesized UiO-66 particles are thermally activated at about 350° C. under dynamic vacuum for 2 about 4 h. About 2.1 g activated UiO-66 particles were homogeneously mixed with the polymer matrix solution by high shear stirring at about 50° C. for 1 about 2 h. About 30 um polypropylene-based microporous layer (denoted as PP, Celgard Inc.) is used as a support separator. Dip coating the support separator with UiO-66-containing mixture yields about 10 um MOF coating layer on the Celgard separator.

Figure 4:
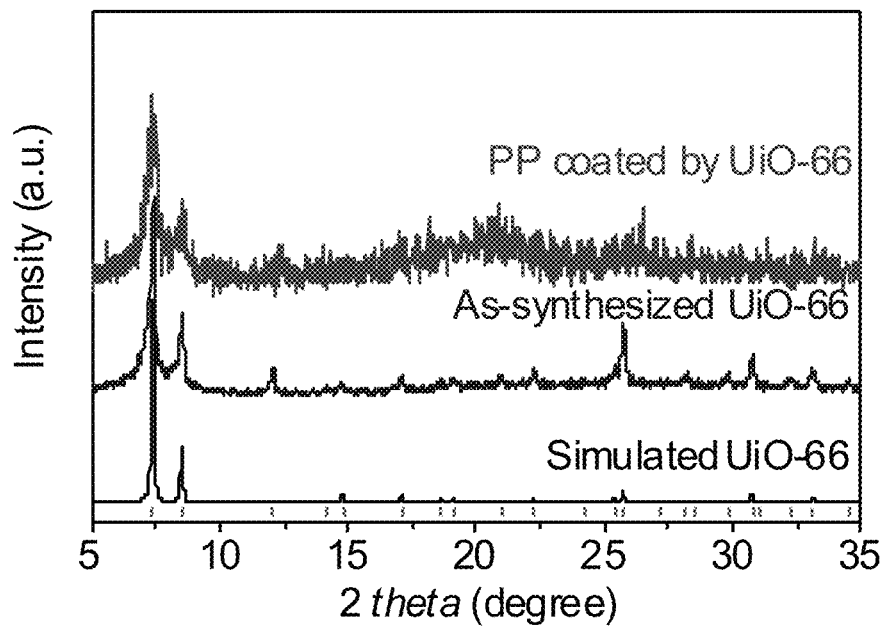
FIG. 4 shows X-ray diffraction patterns of simulated zirconium terephthalate-based MOF (UiO-66), as-synthesized UiO-66 and coated UiO-66 on polypropylene-based separator (support separator, denoted as PP), according to embodiments of the invention.
Figure 5:
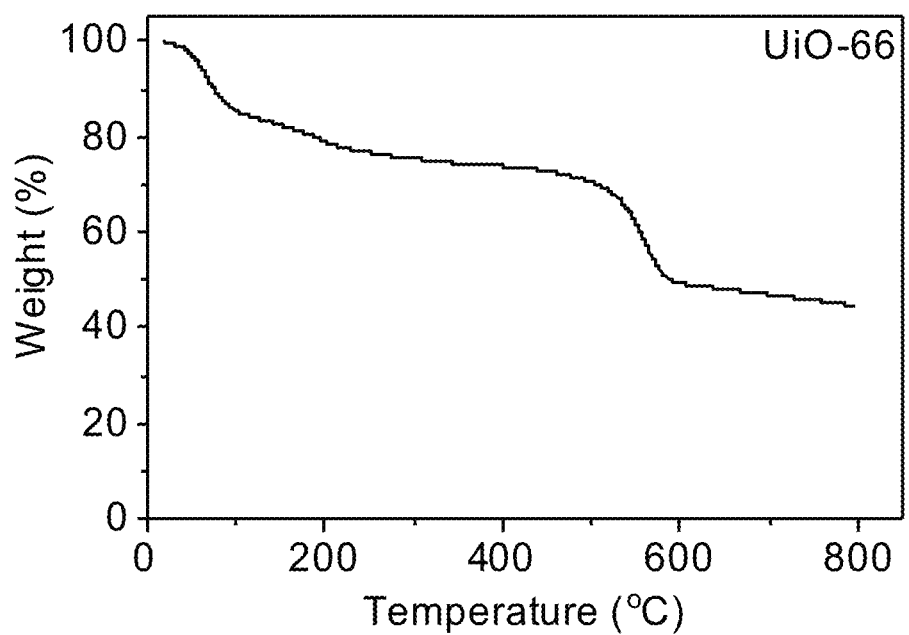
FIG. 5 shows a thermogravimetric analysis curve of UiO-66 in air atmosphere, according to embodiments of the invention.
Figure 6:
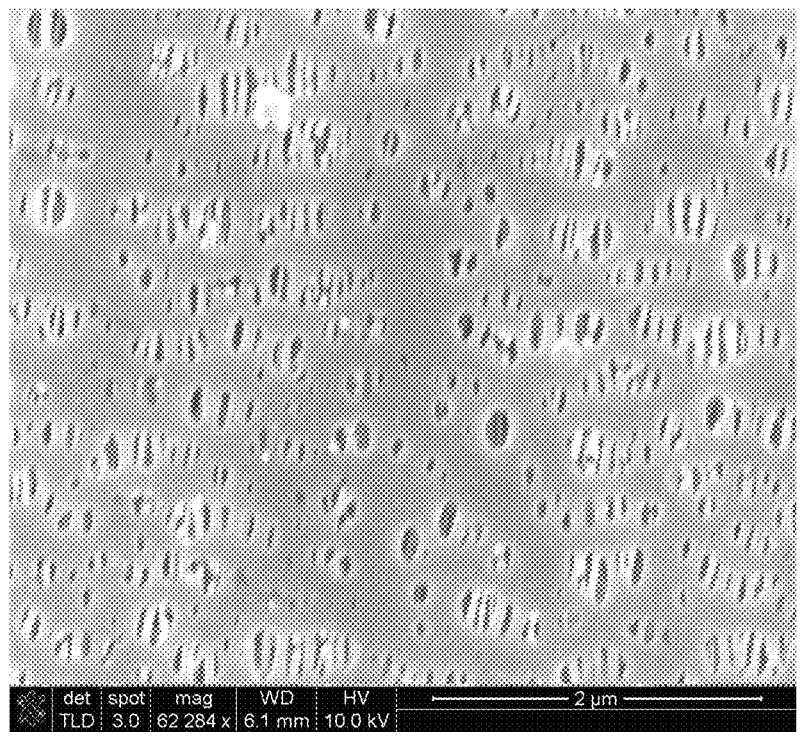
FIG. 6 shows a scanning electron microscopy image of a PP separator (a support separator from Celgard Inc.).
Figure 7:
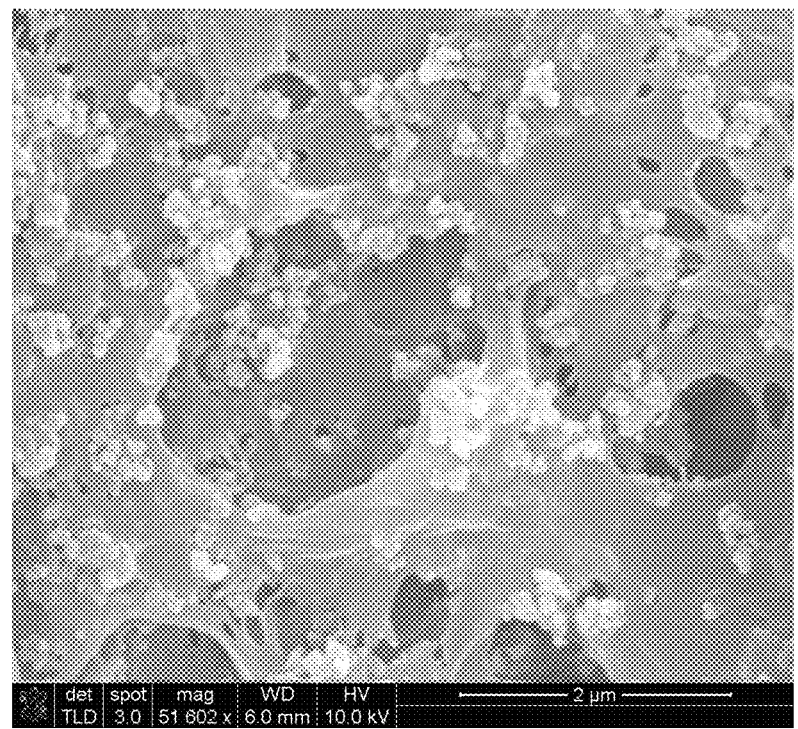
FIG. 7 shows a scanning electron microscopy image of PP coated by UiO-66, according to embodiments of the invention

As referring to FIG. 4, the crystal structure of as-synthesized and activated UiO-66 (on support separator) particles are consistent with simulated UiO-66 structure as confirmed by x-ray powder diffraction. As shown in FIG. 5, the thermogravimetric analysis of UiO-66 confirms the high thermal stability of MOF, which does not decompose up to about 500° C. in air atmosphere. As referring to FIG. 6, the images of scanning electron microscopy of pristine polypropylene microporous separators are shown. The unmodified separator exhibits a porous morphology with pore size of about 30 nm. FIG. 7 shows the composite separator, where the surface of separator is coated with a particulate layer containing UiO-66 particles and PVDF-HFP polymer matrix.

Figure 8:
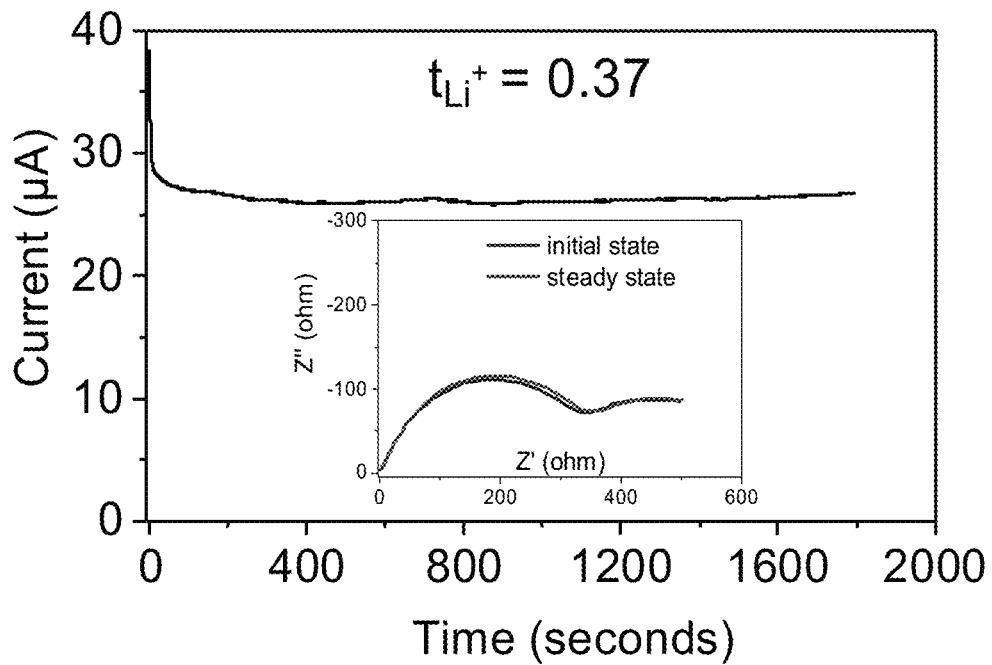
FIG. 8 shows measurements of the lithium ion transference number of the electrolyte in the support separator.
Figure 9:
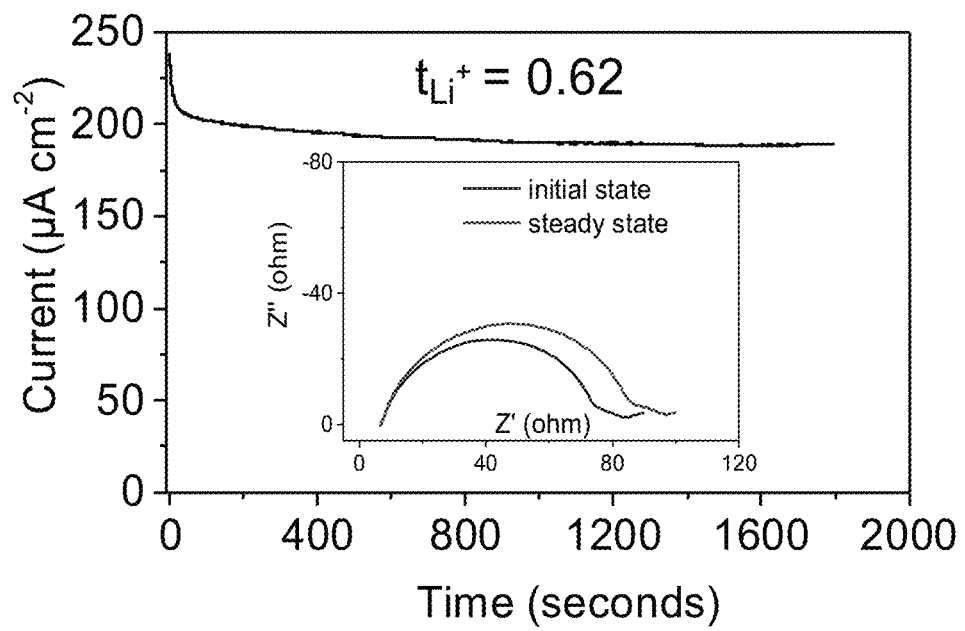
FIG. 9 shows measurements of the lithium ion transference number of the electrolyte in a composite separator with activated UiO-66, according to embodiments of the invention.
Figure 10:
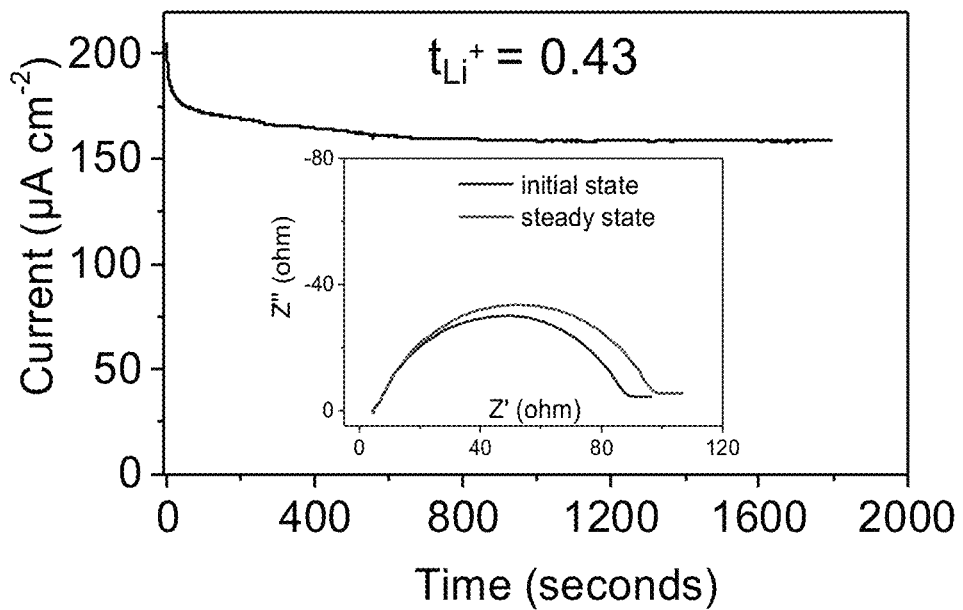
FIG. 10 shows measurements of the lithium ion transference number of the electrolyte in a composite separator with inactivated UiO-66.

A conventional potentiostatic approach is used to evaluate $Li^+$ transference number of electrolytes in pristine support separator and modified composite separator by activated UiO-66, which are displayed in FIGS. 8 and 9, respectively. Herein the exemplified electrolyte is about 1M $LiPF_6$ in ethylene carbonate and diethyl carbonate (EC/DEC=$^{50}/_{50}$ in volume ratio). The $Li^+$ transference number of the electrolyte in composite separator is about 68% higher than the value derived from pristine separator (about 0.62 vs. about 0.37), demonstrating the role of UiO-66 on improving lithium ion conduction. Moreover, the significance of open metal sites in UiO-66 is highlighted in this example. A composite separator is prepared by UiO-66 without activation in a similar manner, the resulting $Li^+$ transference number of the electrolyte in a modified composite separator by inactivated UiO-66 is presented in FIG. 10, the obtained value of about 0.43 is close to the about 0.37 from pristine unmodified separator, further proving the importance of open metal sites Zr (IV) on immobilizing anions in pore channels of MOF.

Figure 11:
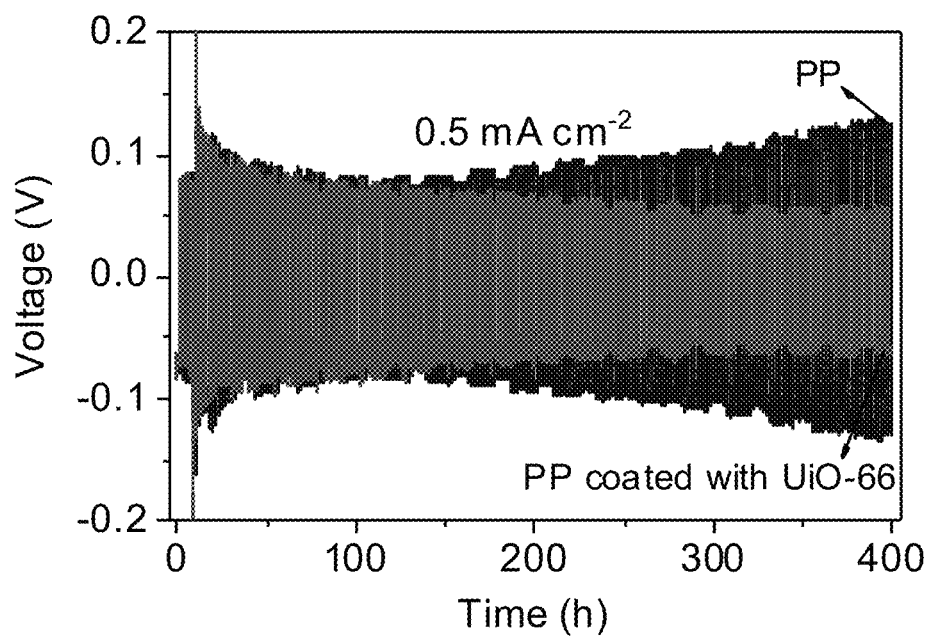
FIG. 11 shows galvanostatic cycling of Li symmetric cells using an electrolyte saturated PP separator and a composite separator, according to embodiments of the invention.
Figure 12:
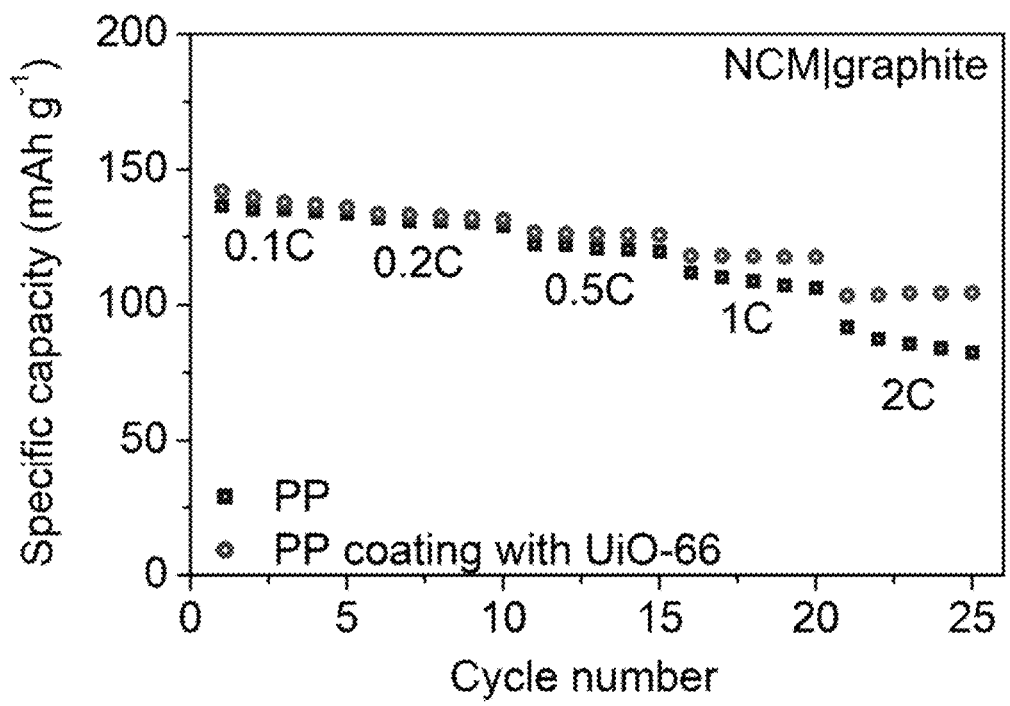
FIG. 12 shows rate performances of full cells ($LiNi_{1/3}Co_{1/3}Mn_{1/3}O_2$ as a cathode and graphite as an anode) using an electrolyte saturated support separator and a composite separator, according to embodiments of the invention.
Figure 13:
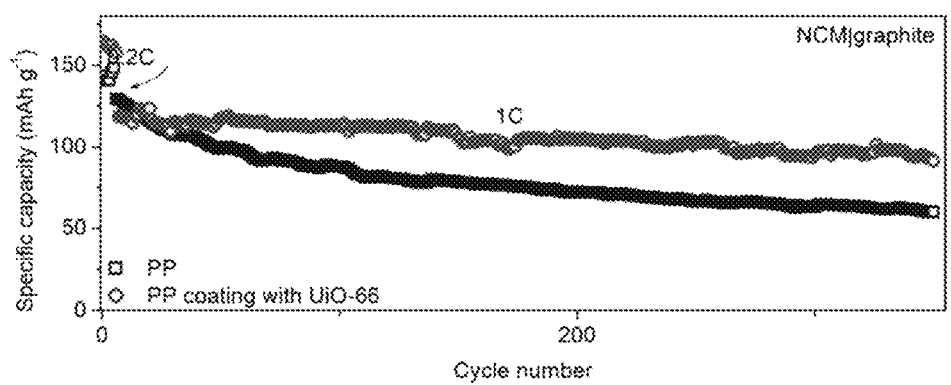
FIG. 13 shows cycle performances of full cells ($LiNi_{1/3}Co_{1/3}Mn_{1/3}O_2$ as a cathode and graphite as an anode) using an electrolyte saturated support separator and a composite separator, according to embodiments of the invention.

The electrochemical stability of the electrolyte-imbibed composite separator against high-energy lithium metal is evaluated in Li symmetric cell at about 0.5 mA $cm^{-2}$. As shown in FIG. 11, the voltage of cell using composite separator exhibit stable and small voltage at about 50 mV, whereas the cell with pristine PP separator shows escalating voltage with cycling up to about 400 h. The electrochemical performances of pristine separator and composite separator (with aforementioned UiO-66 coating) in prototype batteries are shown in FIGS. 12 and 13. Herein, full cells including $LiNi_{1/3}Co_{1/3}Mn_{1/3}O_2$ (NCM) cathode, graphite anode and electrolyte of about 1M $LiPF_6$ in ethylene carbonate and diethyl carbonate are used for device evaluation. The areal loading of active materials is comparable to the commercial benchmarks, where the NCM loading is about 20 mg $cm^{-2}$ and graphite is about 10 mg $cm^{-2}$. FIG. 12 shows the rate performance of full cells using pristine separator and composite separator at various rates from about 0.1 C to 2 C (1 C=160 mA $g^{-1}$), where the cell with composite separator exhibits superior rate capability than the cell using pristine separator. At 2 C, the cell with composite separator retains 76% of its original capacity at 0.1 C, comparing with about 62% for the cell with pristine separator at the same condition. As shown in FIG. 13, the long-term cycle stability of full cells is evaluated at 1 C (initial 5 cycles at 0.2 C), the cell with composite separator shows higher capacity retention of about 76% after about 350 cycles than about 45% for the cell with pristine separator.

Example 2

Figure 14:
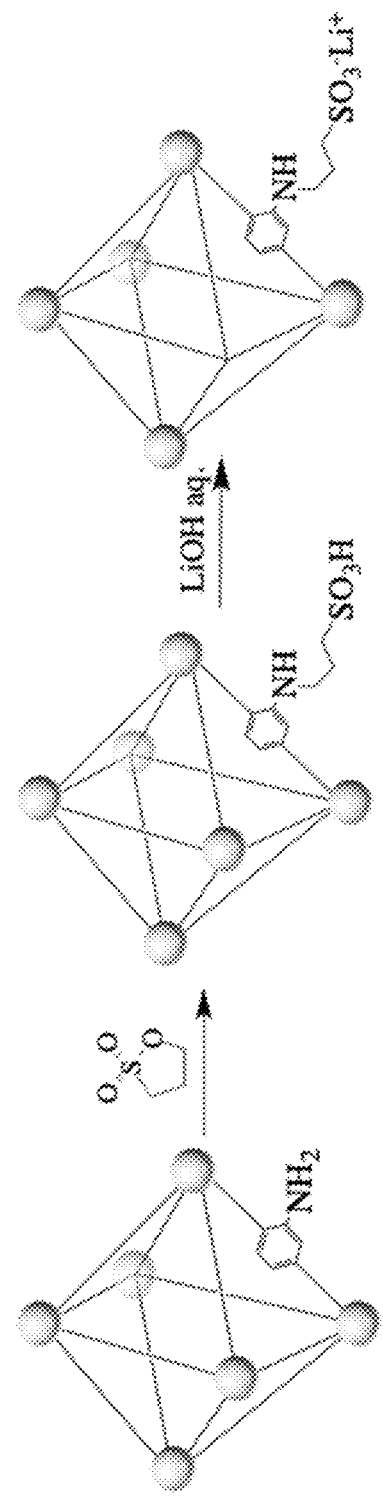
FIG. 14 shows the illustrative drawing of a zirconium-based MOF ($UiO\text{-}66\text{-}NH_2$) with chemical modification on ligands, according to embodiments of the invention.
Figure 15:
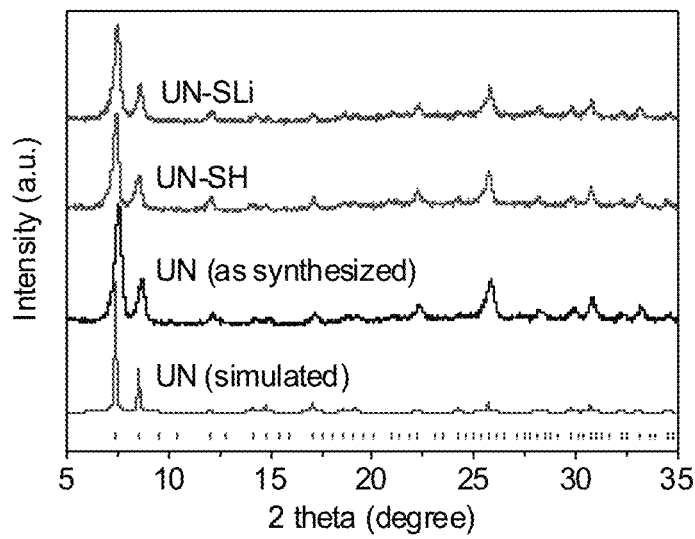
FIG. 15 shows X-ray diffraction patterns of zirconium-based MOF ($UiO\text{-}66\text{-}NH_2$) during the respective chemical modification on ligands, according to embodiments of the invention.
Figure 16:
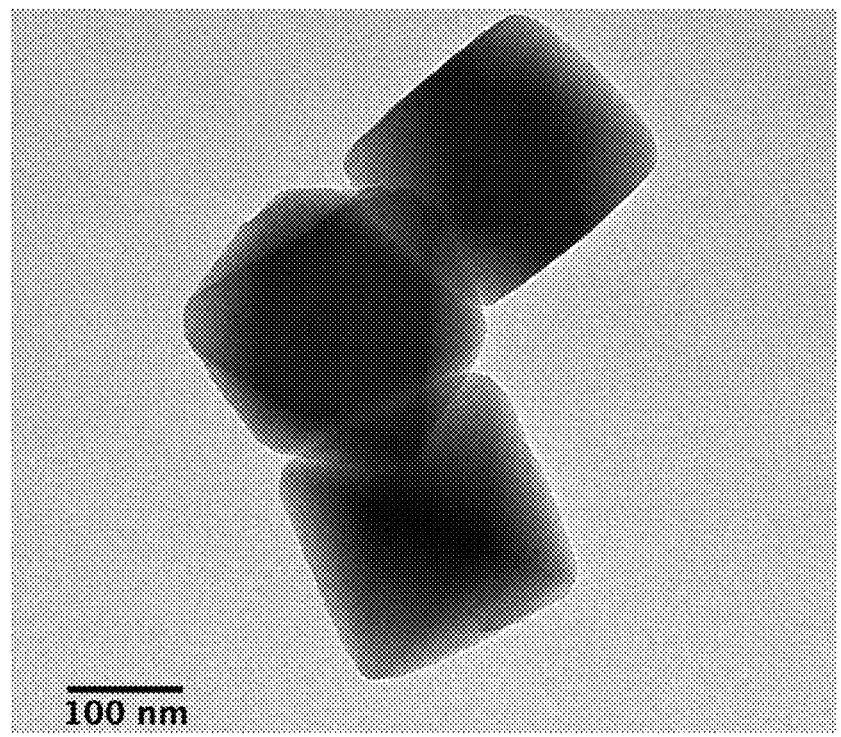
FIG. 16 shows a scanning electron microscopy image of as-synthesized $UiO\text{-}66\text{-}NH_2$, according to embodiments of the invention.
Figure 17:
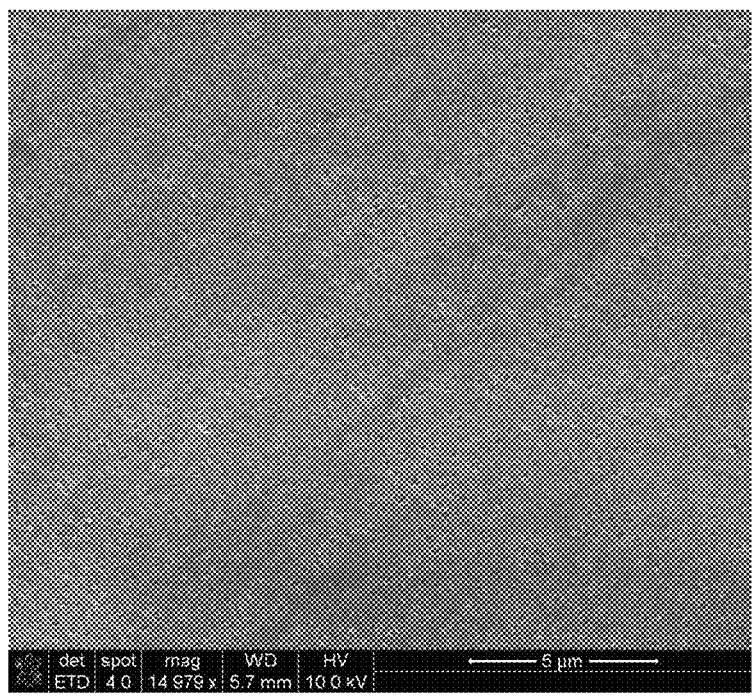
FIG. 17 shows a scanning electron microscopy image of a microporous layer (a support separator from Celgard Inc.).
Figure 18:
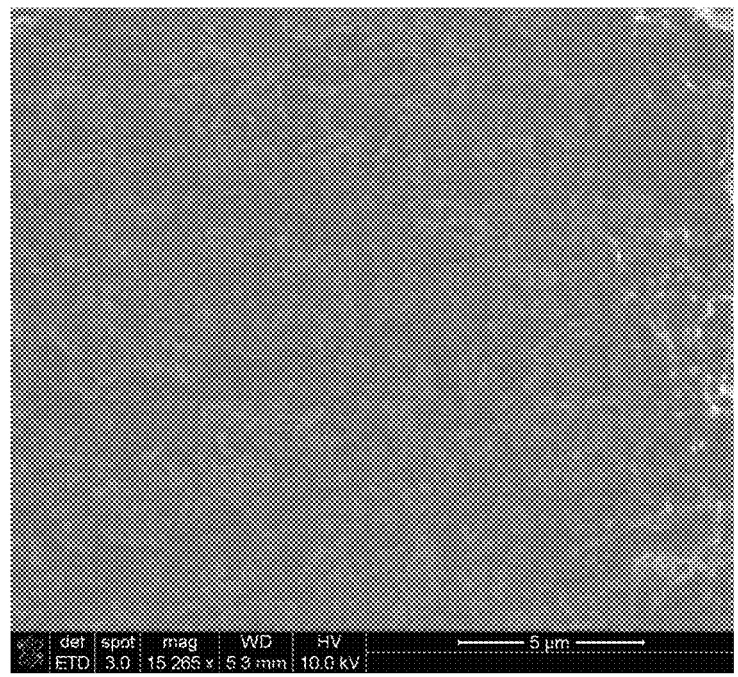
FIG. 18 shows a scanning electron microscopy image of a composite separator with modified $UiO\text{-}66\text{-}NH_2$, according to embodiments of the invention.
Figure 19:
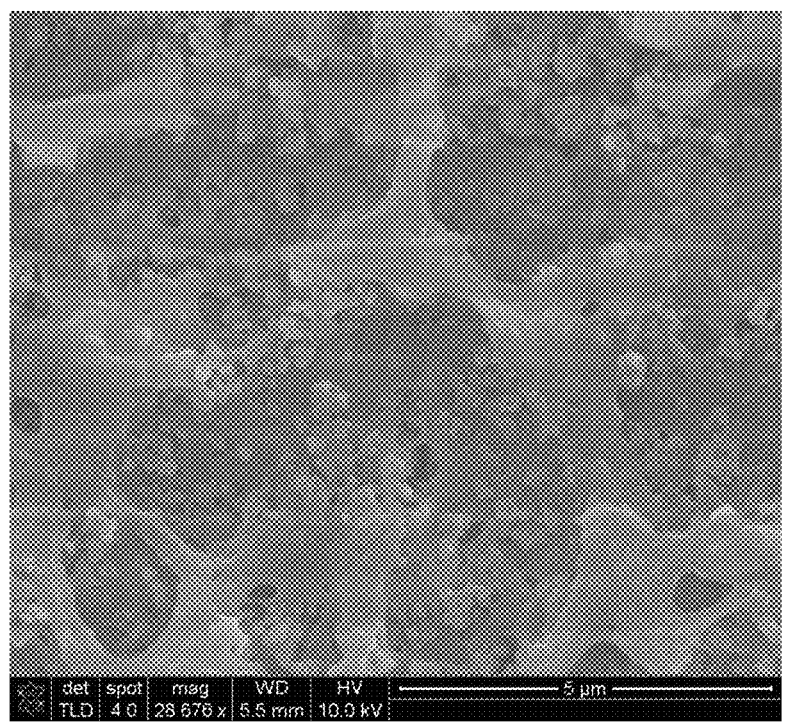
FIG. 19 shows a scanning electron microscopy image of a composite separator with modified $UiO\text{-}66\text{-}NH_2$, according to embodiments of the invention.

This example covers the embodiment as illustrated in FIG. 14, where the lithium transference number of the electrolyte in composite separator can be enhanced by modifying ligands or tuning pore aperture. UiO-66-$NH_2$ (denoted as UN) is synthesized based on a published literature (Chem. Commun. 2013, 49, 9449-9451.). Referring to FIG. 14, the anionic functionalization of UN is shown, where the ligands (2-aminoterephthalic acid) are sulfonated (denoted as UN-SH) and lithiated (UN-SLi) to yield anionic grafted groups repelling the translocation of anions across the separator membrane. As-synthesized UN particles are mixed with excess 1,3-propanesultone in $CHCl_3$. After being stirred at about 45° C. for 12 h, the bright yellow solids are collected through the centrifuge. The solids are washed by $CHCl_3$ three times then dried at about 80° C. to obtain $SO_3H$-functionalized UN. Lithiation of UN-SH is carried out by neutralizing the UN-SH with dilute LiOH aqueous solution. The final UN-SLi was collected by filtering, washed by water and ethanol for three times each, and dried at about 80° C. Before being used for batteries, the powder was further dried at about 120° C. under vacuum condition for activation. The crystal structure of UN, UN-SH, UN-SLi are examined by x-ray diffraction (FIG. 15), all of which are indexable to simulated pattern of UiO-66-$NH_2$.

Figure 20:
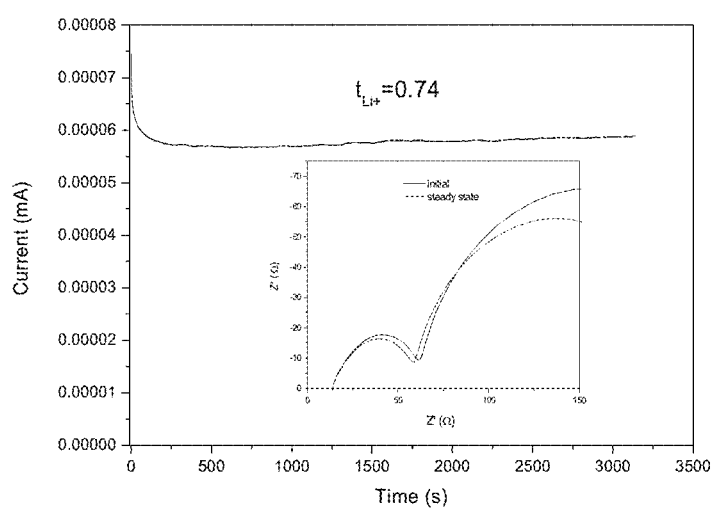
FIG. 20 shows measurements of the lithium ion transference number of the electrolyte in a composite separator with modified $UiO\text{-}66\text{-}NH_2$, according to embodiments of the invention.

The coating of UN-SLi on microporous propylene separator (denoted as PP, Celgard 2325) is conducted by using PVDF-HFP polymer matrix. About 0.4 g PVDF-HFP and 0.6 g UN-SLi are dispersed in 10 mL acetone. After stirring at about 60° C. for about 12 h, PP membrane is dipped coated with the mixture and dried in the air. Repeat for three times. After the coating process, the membrane is dried under about 90° C. in vacuum before use. Other suitable solvents to dissolve the polymer matrix (PVDF-HFP) may be used, for example, co-solvents of ethylene carbonate and dimethyl carbonate (denoted as EC/DMC). Typical scanning electron spectroscopy images of UN, PP, PP coated with UN-SLi by acetone, and PP coated with UN-SLi by EC/DMC are shown in FIGS. 16-19, respectively. Commercial electrolyte, about 1M $LiPF_6$ in ethylene carbonate and diethyl carbonate, from BASF is used to evaluate the ion conduction behaviors in the composite separator. Referring to FIG. 20, the $Li^+$ transference number of the electrolyte in (UN-SLi)-coated PP is about 0.74, indicating that the anionic MOF in composite separator can repel and immobilize the movement of anions while facilitate the conduction of lithium ions.

Briefly, the above disclosed exemplary examples clearly indicate the invention, among other things, achieves at least the following improvements to the lithium batteries: improved lithium transference number; improved overall lithium ion conductivity; reduced interfacial resistance between electrolyte and electrode (cathode or anode); enhanced electrode reaction kinetics; improved electrochemical window of the lithium ion electrolyte; improved power output; improved cycled life; improved thermal stability.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

What is claimed is:

1. A composite separator used for an electrochemical device, comprising:
   at least one porous polymer layer; and
   at least one metal-organic framework (MOF) composite layer coated on at least one porous polymer layer;
   wherein the at least one porous polymer layer serves a mechanical support for the at least one MOF composite layer,
   wherein the at least one MOF composite layer comprises at least one MOF material defining a plurality of pore channels and at least one polymer; wherein the at least one MOF composite layer is formed by coating of a mixture of the at least one MOF material with a polymer solution comprising the at least one polymer dissolved in at least one solvent on the at least one porous polymer layer; and
   wherein the at least one MOF material is a class of crystalline porous scaffolds constructed from metal clusters with organic ligands and is activated at a temperature for a period of time such that the at least one MOF material comprises unsaturated metal centers, open metal sites and/or structural defects that are able to complex with anions in electrolyte, wherein the organic ligands of the at least one MOF material are sulfonated and lithiated to yield anionic grafted groups comprising $SO_3^-Li^+$ that repel translocation of anions across the composite separator.

2. The composite separator of claim 1, wherein said coating includes dip coating, slot-die coating, blade coating, spin coating, or electrospinning.

3. The composite separator of claim 1, wherein the at least one porous polymer layer has pores serving as liquid electrolyte hosts for conducting ions and is an electronic insulator for preventing short circuiting.

4. The composite separator of claim 3, wherein the at least one porous polymer layer comprises one or more polymers including poly-propylene (PP), poly-ethylene (PE), glass fiber (GF), cellulose, polyvinyl alcohol (PVA), polyethylene oxide (PEO), polyvinylidene fluoride (PVDF), polytetrafluoroethylene (PTFE), polyether ether ketone (PEEK), polyimide (PI), polyallylamine (PAH), polyurethane, polyacrylonitrile (PAN), polymethylmethacrylate (PMMA), polytetraethylene glycol diacrylate, copolymers thereof, or their combinations.

5. The composite separator of claim 1, wherein the at least one MOF composite layer comprises an amount of the MOF material in a range of about 5-99 wt % and an amount of the least one polymer in a range of about 1-95 wt %.

6. The composite separator of claim 1, wherein the at least one MOF material is activated by calcination, supercritical $CO_2$, or other treatments.

7. The composite separator of claim 1, wherein the at least one MOF material has tunable ligand functionality and tunable pore sizes, wherein the tunable ligand functionality is negatively charged ligands by chemical modifications, and wherein the tunable pore sizes is grafting of chemical groups in the ligands.

8. The composite separator of claim 1, wherein the organic ligands comprise benzene-1,4-dicarboxylic acid (BDC), benzene-1,3,5-tricarboxylic acid (BTC), biphenyl-4,4'-dicarboxylic acid (BPDC), or their derivatives, and the metal clusters comprise magnesium (Mg), Aluminium (Al), Titanium (Ti), Vanadium (V), Chromium (Cr), Manganese (Mn), Iron (Fe), Cobalt (Co), Nickel (Ni), Copper (Cu), Zinc (Zn), or Zirconium (Zr).

9. The composite separator of claim 8, wherein the at least one MOF material comprises HKUST-1, MIL-100-Al, MIL-100-Cr, MIL-100-Fe, UiO-66, UiO-67, PCN series, MOF-808, MOF-505, MOF-74, or their combinations.

10. The composite separator of claim 9, wherein the at least one MOF material comprises a zirconium containing MOF (Zr-MOF) or zirconium terephthalate-based MOF having a general formula of $Zr_6(\mu3-O_4)(\mu3-OH_4)$ (—COO)$_8$ (OH)$_4$(H$_2$O)$_n$, wherein n is an integer less than 10.

11. The composite separator of claim 1, wherein the at least one polymer comprises polyvinylidene fluoride (PVDF), polytetrafluoroethylene (PTFE), poly(vinylidene fluoride-co-hexafluoropropylene) (PVDF-HFP), PVDF-tetrahydrofuran (PVDF-THF), PVDF-chlorotrifluoroethylene (PVDF-CTFE), poly(methyl methacrylate) (PMMA), polyacrylonitrile (PAN), and polyethyleneoxide (PEO), copolymers thereof, or their combinations.

12. The composite separator of claim 1, wherein the at least one solvent comprises acetone, water, methanol, ethanol, acetic acid, dimethylformamide (DMF), dimethylacetamide (DMAc), N-Methyl-2-pyrrolidone (NMP), tetrahydrofuran (THF), ethylene carbonate (EC), dimethyl carbonate (DMC), or their combinations.

13. An electrochemical device, comprising:
a positive electrode, a negative electrode, an electrolyte disposed between the positive and negative electrodes, and a separator disposed in the electrolyte,
wherein the electrolyte is an liquid electrolyte comprising a metal salt dissolved in a non-aqueous solvent; and
wherein the separator is the composite separator of claim 1.

14. The electrochemical device of claim 13, wherein the non-aqueous solvent comprises one or more of ethylene carbonate (EC), propylene carbonate (PC), vinylene carbonate (VC), fluoroethylene carbonate (FEC), butylene carbonate (BC), dimethyl carbonate (DMC), diethyl carbonate (DEC), ethylmethyl carbonate (EMC), methylpropyl carbonate (MPC), butylmethyl carbonate (BMC), ethylpropyl carbonate (EPC), dipropyl carbonate (DPC), cyclopentanone, sulfolane, dimethyl sulfoxide, 3-methyl-1,3-oxazolidine-2-one, γ-butyrolactone, 1,2-di-ethoxymethane, tetrahydrofuran, 2-methyltetrahydrofuran, 1,3-dioxolane, methyl acetate, ethyl acetate, nitromethane, 1,3-propane sultone, γ-valerolactone, methyl isobutyryl acetate, 2-methoxyethyl acetate, 2-ethoxyethyl acetate, diethyl oxalate, an ionic liquid, chain ether compounds including at least one of gamma butyrolactone, gamma valerolactone, 1,2-dimethoxyethane and diethyl ether, and cyclic ether compounds including at least one of tetrahydrofuran, 2-methyltetrahydrofuran, 1,3-dioxolane and dioxane.

15. The electrochemical device of claim 13, wherein anions in the liquid electrolytes are spontaneously adsorbed by the at least one MOF material and immobilized within the pore channels, thereby liberating metal ions and leading to the metal ions transport with a metal ion transference number higher than that of a separator without the at least one MOF material.

16. The electrochemical device of claim 15, wherein the metal ions transference number is a ratio of a metal ion conductivity to an ionic conductivity, wherein the ionic conductivity is a total value of the metal ion conductivity and anionic conductivity.

17. The electrochemical device of claim 16, wherein the metal ion transference number of the liquid electrolytes in the composite separator is in a range of about 0.5-1.

18. The electrochemical device of claim 13, wherein the metal salt comprises one or more of a lithium salt, a sodium salt, a magnesium salt, a zinc salt, and an aluminum salt,
wherein the lithium salt comprises one or more of lithium hexafluorophosphate, lithium hexafluoroarsenate, lithium bis(trifluoromethlysulfonylimide) (LiTFSI), lithium bis(trifluorosulfonylimide), lithium trifluoromethanesulfonate, lithium fluoroalkylsufonimides, lithium fluoroarylsufonimides, lithium bis(oxalate borate), lithium tris(trifluoromethylsulfonylimide)methide, lithium tetrafluoroborate, lithium perchlorate, lithium tetrachloroaluminate, and lithium chloride;
wherein the sodium salt comprises one or more of sodium trifluoromethanesulfonate, NaClO$_4$, NaPF$_6$, NaBF$_4$, NaTFSI (sodium(I) Bis(trifluoromethanesulfonyl)imide), and NaFSI (sodium(I) Bis(fluorosulfonyl)imide);
wherein the magnesium salt comprises one or more of magnesium trifluoromethanesulfonate, Mg(ClO$_4$)$_2$, Mg(PF$_6$)$_2$, Mg(BF$_4$)$_2$, Mg(TFSI)$_2$ (magnesium(II) Bis(trifluoromethanesulfonyl)imide), and Mg(FSI)$_2$ (magnesium(II) Bis(fluorosulfonyl)imide); and
wherein the zinc salt comprises one or more of zinc trifluoromethanesulfonate, Zn(ClO$_4$)$_2$, Zn(PF$_6$)$_2$, Zn(BF$_4$)$_2$, Zn(TFSI)$_2$ (zinc(II) Bis(trifluoromethanesulfonyl)imide), Zn(FSI)$_2$ (zinc(II) Bis(fluorosulfonyl) imide).

19. The electrochemical device of claim 18, being a lithium battery, a sodium battery, a magnesium battery, or a zinc metal battery,
wherein for the lithium battery, the positive electrode comprises one or more of LiCoO$_2$ (LCO), LiNiMnCoO$_2$ (NMC), lithium iron phosphate (LiFePO$_4$), lithium iron fluorophosphate (Li$_2$FePO$_4$F), an over-lithiated layer by layer cathode, spinel lithium manganese oxide (LiMn$_2$O$_4$), lithium cobalt oxide (LiCoO$_2$), LiNi$_{0.5}$Mn$_{1.5}$O$_4$, lithium nickel cobalt aluminum oxide including LiNi$_{0.8}$Co$_{0.15}$Al$_{0.05}$O$_2$ or NCA, lithium vanadium oxide (LiV$_2$O$_5$), and Li$_2$MSiO$_4$ with M being composed of a ratio of Co, Fe, and/or Mn; and wherein the negative electrode comprises one or more of lithium metal (Li), graphite, hard or soft carbon, graphene, carbon nanotubes, titanium oxide including at least one Li$_4$Ti$_5$O$_{12}$ and TiO$_2$, silicon (Si), tin (Sn), germanium (Ge), silicon monoxide (SiO), silicon oxide (SiO$_2$), tin oxide (SnO$_2$), and transition metal oxide including at least one of Fe$_2$O$_3$, Fe$_3$O$_4$, Co$_3$O$_4$ and Mn$_x$O$_y$; and
wherein the positive electrode comprises one or more of NaMnO$_2$, NaFePO$_4$ and Na$_3$V$_2$(PO$_4$)$_3$ for the sodium battery, one or more of TiSe$_2$, MgFePO$_4$F, MgCo$_2$O$_4$ and V$_2$O$_5$ for the magnesium battery, or one or more of γ-MnO$_2$, ZnMn$_2$O$_4$, and ZnMnO$_2$ for the zinc battery.

* * * * *